(No Model.)

C. S. GERRITSON.
CAR BRAKE.

No. 270,300. Patented Jan. 9, 1883.

Witnesses:
J. H. Earley
A. A. Hill

Inventor:
Charles S. Gerritson,
Per C. A. Shaw
Atty.

N. PETERS, Photo-Lithographer, Washington, D. C.

UNITED STATES PATENT OFFICE.

CHARLES S. GERRITSON, OF WALTHAM, MASSACHUSETTS.

CAR-BRAKE.

SPECIFICATION forming part of Letters Patent No. 270,300, dated January 9, 1883.

Application filed November 22, 1882. (No model.)

*To all whom it may concern:*

Be it known that I, CHARLES S. GERRITSON, of Waltham, in the county of Middlesex and State of Massachusetts, have invented a certain new and useful Improvement in Car-Brakes, of which the following is a description sufficiently full, clear, and exact to enable any person skilled in the art or science to which said invention appertains to make and use the same, reference being had to the accompanying drawings, forming a part of this specification, in which—

Figure 3:
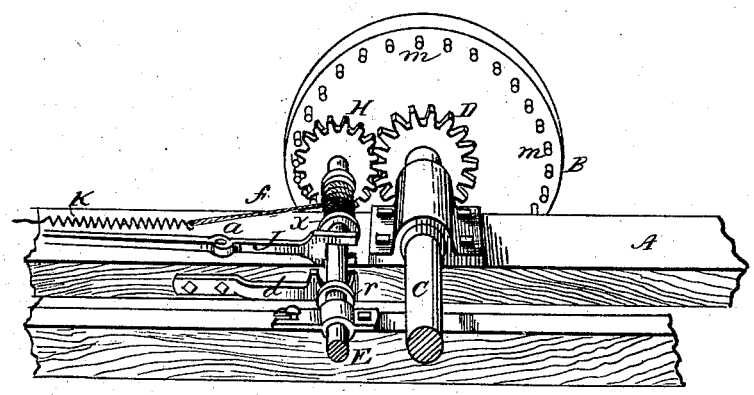
Figure 2:
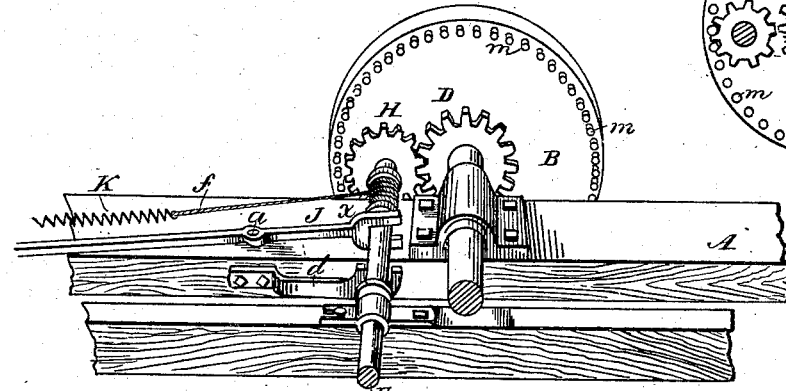
Figure 4:
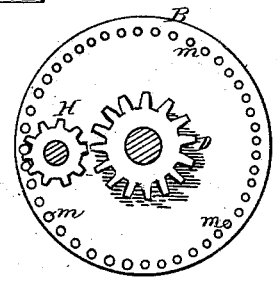
Figure 1:
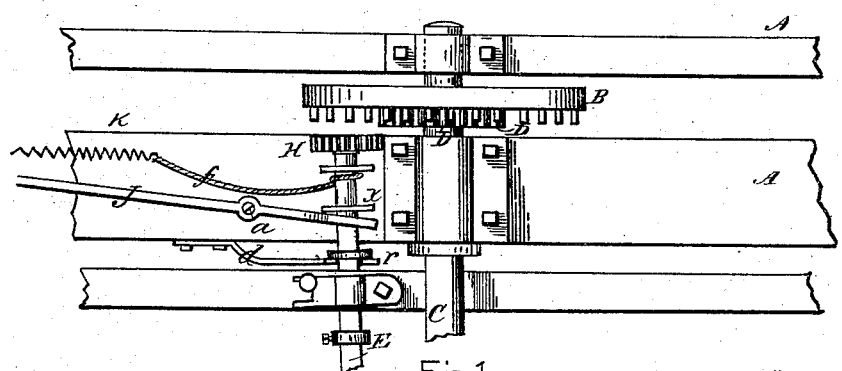

Figure 1 is a bottom plan view, representing the brake-wheel detached from the truck-gear; Fig. 2, an isometrical perspective view, representing it connected therewith; Fig. 3, a like view representing the car-wheel locked; Fig. 4, a side elevation of the inside of the truck, showing the position of the brake-wheel when the brake is used as a starter.

Like letters of reference indicate corresponding parts in the different figures of the drawings.

My invention relates to that class of car-brakes which are especially adapted for use with horse-cars; and it consists in a novel construction and arrangement of the parts, as hereinafter more fully set forth and claimed, by which a simple, cheap, and very effective device is produced which performs the double service of a brake and starter, assisting to stop the car when in motion and to start it when at rest.

The nature and operation of my improvement will be readily understood by all conversant with such matters from the following explanation.

In the drawings, A represents the frame-work of the bottom of the car; B, the truck; C, the axle, and D the brake-shaft.

The truck is provided with a series of laterally-projecting pins, m, on its inner face, near its periphery, and with the gear D, which is rigidly mounted on the axle C between the truck and frame-work A. A brake-shaft, E, is mounted on the under side of the frame-work, being journaled in the swiveling box G, and is provided at its outer end with the spur-wheel H, designed to intermesh with the gear D. A brake-lever, J, is pivoted to the frame at a and bifurcated or forked to pass over the shaft E near the fixed collet or annular flange x, attached to said shaft. A spring, d, is attached to the frame, and acts expansively against a fixed collet, r, to move the shaft E longitudinally away from the wheel B, and thereby prevent the wheel H from intermeshing with the gear D when desired. A spring, K, has one of its ends secured to the frame-work A and its other to a chain or cord, f, which passes around the shaft E and is secured thereto, the spring acting contractively to draw the wheel H away from the gear D.

It will be understood that the lever J is connected with a wheel or with another lever in charge of the driver of the car in such a manner that it may be operated to move the wheel H into or out of contact with the gear D at pleasure. When the car is in motion and the brake is in the position shown in Fig. 1, if it is desired to stop the same, the lever J is swung on its pivot a against the collet x to move the shaft E toward the wheel B, the cord f being loose and the spring K not acting on said shaft.

This motion of the lever makes its forked or bifurcated end describe the arc of a circle, pushing the outer end of the shaft E toward the shaft C and causing the wheel H to intermesh with the gear D, as shown in Fig. 2, thereby winding up the cord f onto the shaft E until the force of the spring K overcomes the momentum of the car and stops it. The shaft J is then suddenly reversed or moved back slightly, permitting the spring to contract sufficiently to draw the shaft E away from the shaft C until the wheel H intermeshes with the pins m, but is not entirely withdrawn from the gear D, as shown in Fig. 3, thereby locking the wheel B or holding it firmly in position, and preventing the car from moving either ahead or back. The car being stationary, as described, and the brake in the position shown in Fig. 3, when it is desired to start it, the lever J is moved again in a direction to allow the spring d to throw the shaft E away from the wheel B, permitting the spring K to contract still more, disconnecting the wheel H from the gear D and causing it to intermesh with the pins m on the wheel B. The wheel H being now disconnected from the gear D, the spring K is left free to act on said wheel through the cord f and shaft E to turn the wheel B, and thereby assist in starting up the car, in a manner which will be readily obvious without a more explicit description.

It will be seen that nearly all the power or force required in stopping the car or overcoming its momentum is stored up in the spring K, and that when the wheel H is disconnected from the gear D and caused to intermesh with the pins m, as described, the power is utilized to the best advantage in starting up the car, being applied through the pins m to the periphery of the wheel B, or to the outer ends or long arms of the series of levers of which said wheel is composed.

It will be understood that a brake of the character described may be connected with one or more of the wheels of the car, and all of the brakes connected in such a manner as to be conjointly operated by the brakeman.

Having thus explained my invention, what I claim is—

The improved car-brake described, the same consisting of the shaft E, provided with the wheel H, spring K, chain $f$, lever J, spring $d$, and collets $r\ x$, in combination with the truck B, provided with the gear D, and pins $m$, arranged to operate substantially as specified.

CHAS. S. GERRITSON.

Witnesses:
C. A. SHAW,
A. A. HILL.